Aug. 21, 1956  H. P. KELLEY  2,759,407
TRACTOR GUIDES
Filed Feb. 25, 1952  2 Sheets-Sheet 1
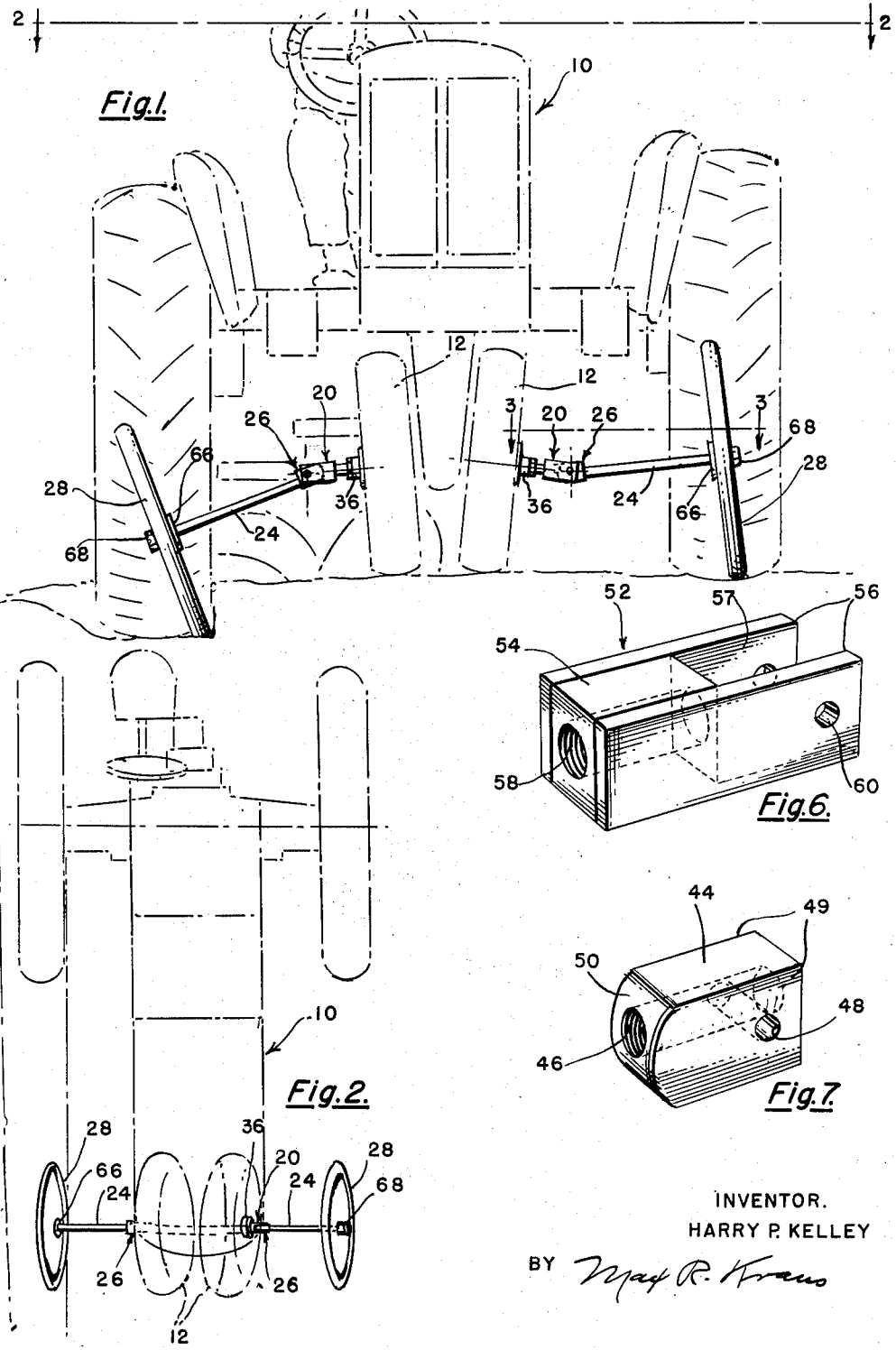
INVENTOR.
HARRY P. KELLEY
BY
ATTORNEY

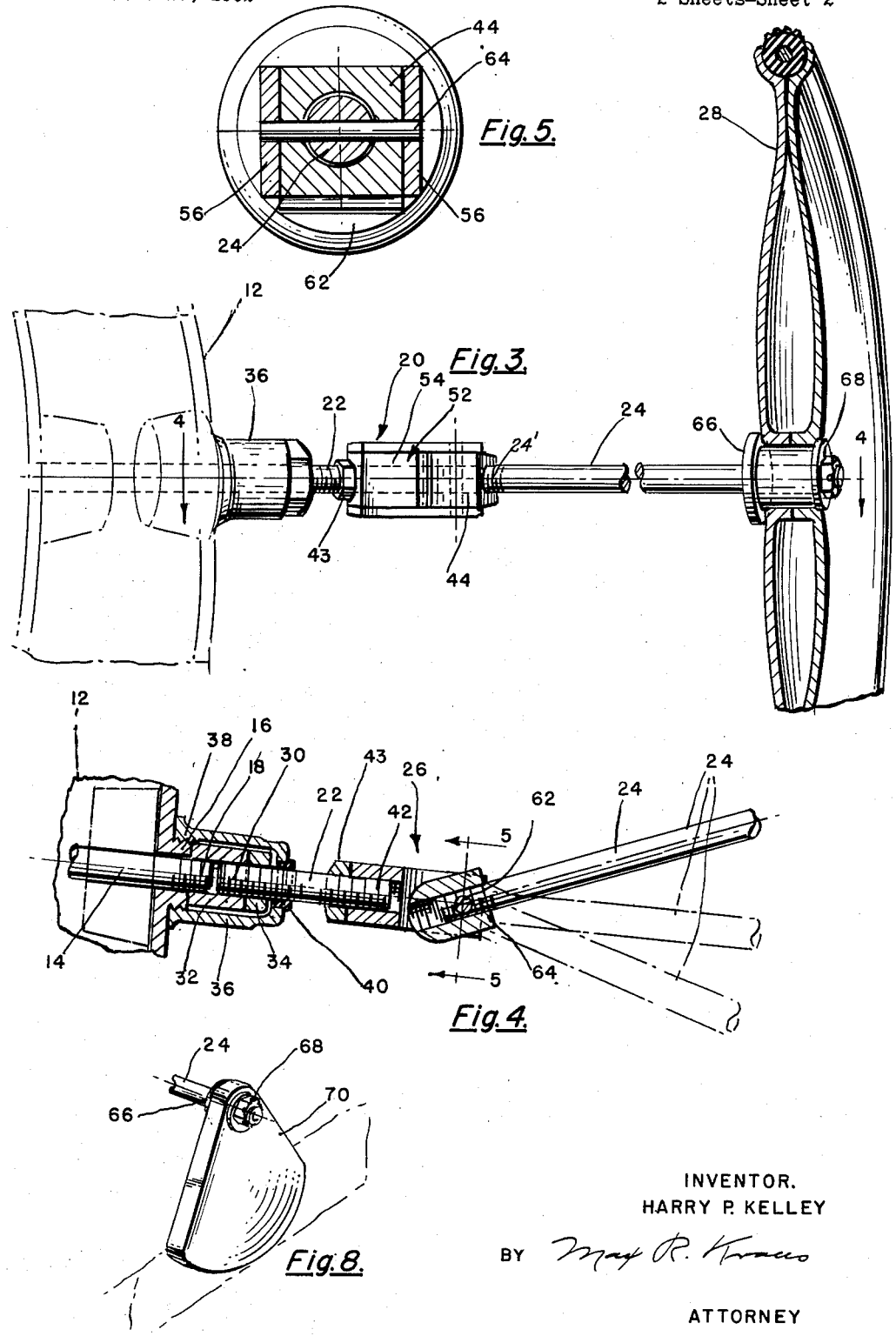

United States Patent Office 2,759,407
Patented Aug. 21, 1956

2,759,407

TRACTOR GUIDES

Harry P. Kelley, Elgin, Ill.

Application February 25, 1952, Serial No. 273,330

4 Claims. (Cl. 97—47.02)

This invention relates to improvements in tractor guides.

One of the objects of this invention is to provide a tractor guide which is coaxially attached to the front tractor axle to effectively guide the tractor.

Another object of this invention is to provide an attachment to tractors which may be readily and quickly attached coaxially of the front tractor axle which is very simple in construction, which utilizes a minimum of parts and which effectively acts to guide the tractor during plowing.

The prior art has utilized tractor guides, however, such guides are not constructed nor do they operate in the manner of the present invention. The constructions of the prior art mount the guide wheel or guide means forwardly and laterally or laterally of the front tractor wheels by utilizing various assemblies which are rather elaborate, costly and time consuming to install. The present invention provides a construction which utilizes a pivotal shaft attached coaxially to the ends of the front wheel tractor axle, which unit is comparatively inexpensive, utilizes a minimum number of parts, is readily attached to and detached from the front axle in a minimum of time by a simple operation and which serves more positively to guide the tractor. It likewise requires a minimum of storage space when not in use.

Other objects will become apparent as this description progresses.

In the drawings:

Fig. 1 is a phantom view of a tractor showing in full lines my guide means attached thereto.

Fig. 2 is a top plan view taken on line 2—2 of Fig. 1.

Fig. 3 is a view taken on line 3—3 of Fig. 1.

Fig. 4 is a cross-sectional view taken on line 4—4 of Fig. 3.

Fig. 5 is a cross-sectional view taken on line 5—5 of Fig. 4.

Fig. 6 is a perspective view of the connector means.

Fig. 7 is a perspective view of the block which is secured to the connector, and Fig. 8 is a view of the arm which may be used in lieu of the guide wheel.

The tractor generally indicated at 10 has the usual pair of front steering wheels 12 and the usual front wheel non-rotatable axle 14 on which said wheels are journalled. Normally the usual hub caps are secured to the threaded hubs 16 of the wheels. In attaching my invention to the front axle 14, the usual hub caps are removed exposing the threaded end 18 of the axle 14 to which is secured the auxiliary unit generally indicated at 20 forming this invention. The auxiliary unit 20 generally comprises a short shaft or stub 22, a longer shaft or arm 24 pivotally secured as generally indicated at 26 and a guide wheel or member 28 which runs in the furrow.

The short shaft or stub 22 which is secured to the front axle 14 of the tractor after the usual hub cap is removed from the axle, has a threaded end 30 which is coaxially aligned with the threaded axle 14 of the tractor. A hexagonal internally threaded nut 32 is screwed on the axle 14 and stub 22 to align and hold the two. A lock nut 34 is secured on the stub 22 to lock said parts together and to prevent rotation of stub 22. A hub cap 36 having a threaded end 38 is secured to the threaded hub 16 of the wheel and encloses the hexagonal nut 32 and lock nut 34. A packing ring 40 is positioned on the stub 22 adjacent the outer end of the hub cap 36. The hub cap is filled with the usual grease. The other end of the stub 22 is threaded as at 42.

The yoke or connector generally indicated at 52 is shown in perspective in Fig. 6 and is of substantially rectangular shape and comprises a body portion 54 having spaced parallel extensions or ears 56 integrally formed therewith to provide a space 57 therebetween. The body portion 54 has a longitudinal threaded bore 58 which is secured to the threaded end 42 of the stub 22 and the extensions 56 have transverse openings 60. A lock and adjusting nut 43 is secured on the stub 22 adjacent the connector 54. A longitudinal adjustment can be effected between the stub 22 and connector 52. A block member generally indicated at 44 and shown in perspective in Fig. 7, has a threaded longitudinal bore 46 which is secured to the threaded end 24' of the shaft or arm 24.

The block 44 has a transverse opening 48 to accommodate a pin 62. Said block has vertical sides 49 and a curved front 50 and same fits between the ears 56 and is pivotally connected to the connector member 52 by the pin 62 which passes through openings 60 in the ears 56 and through a transverse opening 64 in the shaft or arm 24 as more clearly shown in Fig. 5.

The shaft or arm 24 has a flanged portion 66 adjacent one end thereof. The guide wheel 28 is rotatably supported on the axle portion of said shaft 24 and journals on suitable bearings and is held on said shaft by suitable lock nuts and washers 68.

If desired, the arm 70 shown in Fig. 8, may be substituted for the guide wheel 28. The arm is then suitably secured to the end of shaft 24. The arm will then ride in the furrow.

The auxiliary units forming this invention, may be secured to either or both sides of the front wheels. The pivotal connection described provides a vertical pivot and permits the shaft 24 to move out of alignment with the longitudinal axis of the stub 22 and axle 14 and permits sufficient compensation and play between the guide wheels (or guide arms) and their shafts to enable the guide member to run in uneven, sinuous, depressed or elevated furrows as shown in Fig. 1 and to guide the tractor.

The purpose of the present invention is to positively guide the tractor in that the guide wheels or guide arms when set in a previously formed furrow will follow the sinuosity of said furrow as the tractor is driven over the field and will hold the tractor and the plows or other implements drawn thereby to paths parallel with the furrow in which the guide members are engaged.

It will be understood that various changes may be made without departing from the spirit and scope of the appended claims.

I claim:

1. In a tractor guide for guiding the tractor steering wheels, the combination of a first shaft coaxially attached to the non-rotatable steering axle of a tractor, a second shaft pivotally secured to said first shaft coaxially thereof for movement in a vertical plane only, said second shaft supporting guide means in axial alignment with said steering axle adapted to engage a furrow, the distance between the guide means and the pivotal connection to the first shaft being greater than the distance between the attachment of the first shaft to the steering axle and the pivotal connection to the second shaft, the movement of said second shaft and guide means in a horizontal plane will directly impart to the first shaft and steering axle a corresponding movement whereby the tractor steering wheels will be automatically turned.

2. In a tractor guide for guiding the tractor steering wheels, the combination of means coaxially attached to the fixed axle and wheels of a tractor, a shaft pivotally and coaxially secured to said means and extending laterally thereof for movement in vertical plane only, said shaft supporting a guide member on the outer end thereof which is adapted to engage a furrow, said guide member extending laterally of said steering axle and in axial alignment with said steering axle, the distance between the guide member and the pivotal connection of said shaft being greater than the distance between the attachment of the means attached to the steering axle and the pivotal connection of the shaft, the movement of said shaft and guide member in a horizontal plane will directly impart to the means attached to the steering wheels and steering axle a correpsonding movement whereby the steering wheels will be automatically turned.

3. In a tractor guide for guiding the tractor steering wheels, the combination of means coaxially attached to the non-rotatable steering axle and wheels of a tractor and supporting a short shaft laterally thereof, a second shaft longer than said first shaft pivotally and coaxially secured to said first shaft for movement in a vertical plane only, said second shaft supporting a guide member on the outer end thereof which is adapted to engage a furrow, said guide member extending laterally of said steering axle and in substantially axial alignment with said steering axle, the movement of said second shaft and guide member in horizontal plane will directly impart to the first shaft and steering axle a corresponding movement whereby the tractor steering wheels will be automatically turned.

4. In a tractor guide for guiding the tractor steering wheels, the combination of a short stem coaxially attached to the fixed steering axle of a tractor, said stem supporting a connecting member having a pair of ears, a shaft longer than said stem having a block member pivotally secured between said ears for movement in a vertical plane only, said shaft supporting a guide member in substantially axial alignment with said steering axle, the movement of said shaft and guide member in a horizontal plane will directly impart to the stem and steering axle a corresponding movement whereby the tractor steering wheels will be automatically turned.

References Cited in the file of this patent

UNITED STATES PATENTS

| | | |
|---|---|---|
| 986,615 | Wheelock | Mar. 14, 1911 |
| 1,031,065 | Hackney | July 2, 1912 |
| 1,343,062 | Roan | June 8, 1920 |
| 1,567,853 | McKee | Dec. 29, 1925 |
| 1,977,273 | Hansen | Oct. 16, 1934 |
| 2,107,535 | Irlbeck | Feb. 8, 1938 |
| 2,465,660 | Phillips | Mar. 29, 1949 |
| 2,555,793 | Frye | June 5, 1951 |